United States Patent
Nelson

[15] 3,656,697
[45] Apr. 18, 1972

[54] TIRE PULVERIZER

[72] Inventor: David J. Nelson, Route 17, P.O. Box 915 16914 Creeksouth, Houston, Tex. 77040

[22] Filed: June 11, 1970

[21] Appl. No.: 45,315

[52] U.S. Cl. ..........................................241/222, 241/236
[51] Int. Cl. ..........................................................B02c 49/20
[58] Field of Search..................241/159, 222, 223, 227, 235, 241/236; 157/13

[56] References Cited

UNITED STATES PATENTS

| | | |
|---|---|---|
| 3,062,460 | 11/1962 | Bunney..............................241/236 X |
| 2,737,237 | 3/1956 | Herzegh...................................157/13 |
| 382,973 | 5/1888 | Groat..................................241/235 X |
| 2,753,908 | 7/1956 | Anderson............................241/236 X |
| 3,089,409 | 5/1963 | Tretheway et al. ................241/236 X |
| 3,504,621 | 4/1970 | Qualheim...........................241/159 X |

Primary Examiner—Granville Y. Custer, Jr.
Attorney—Pravel, Wilson and Matthews

[57] ABSTRACT

A tire pulverizer adapted to receive and cut automobile, truck or other vehicle tires into small particles, wherein the pulverizer has a plurality of rows of interfitting abrading rotating blades disposed in substantially a V-shape and through which the tires are fed as they are cut into the small particles by the blades.

9 Claims, 4 Drawing Figures

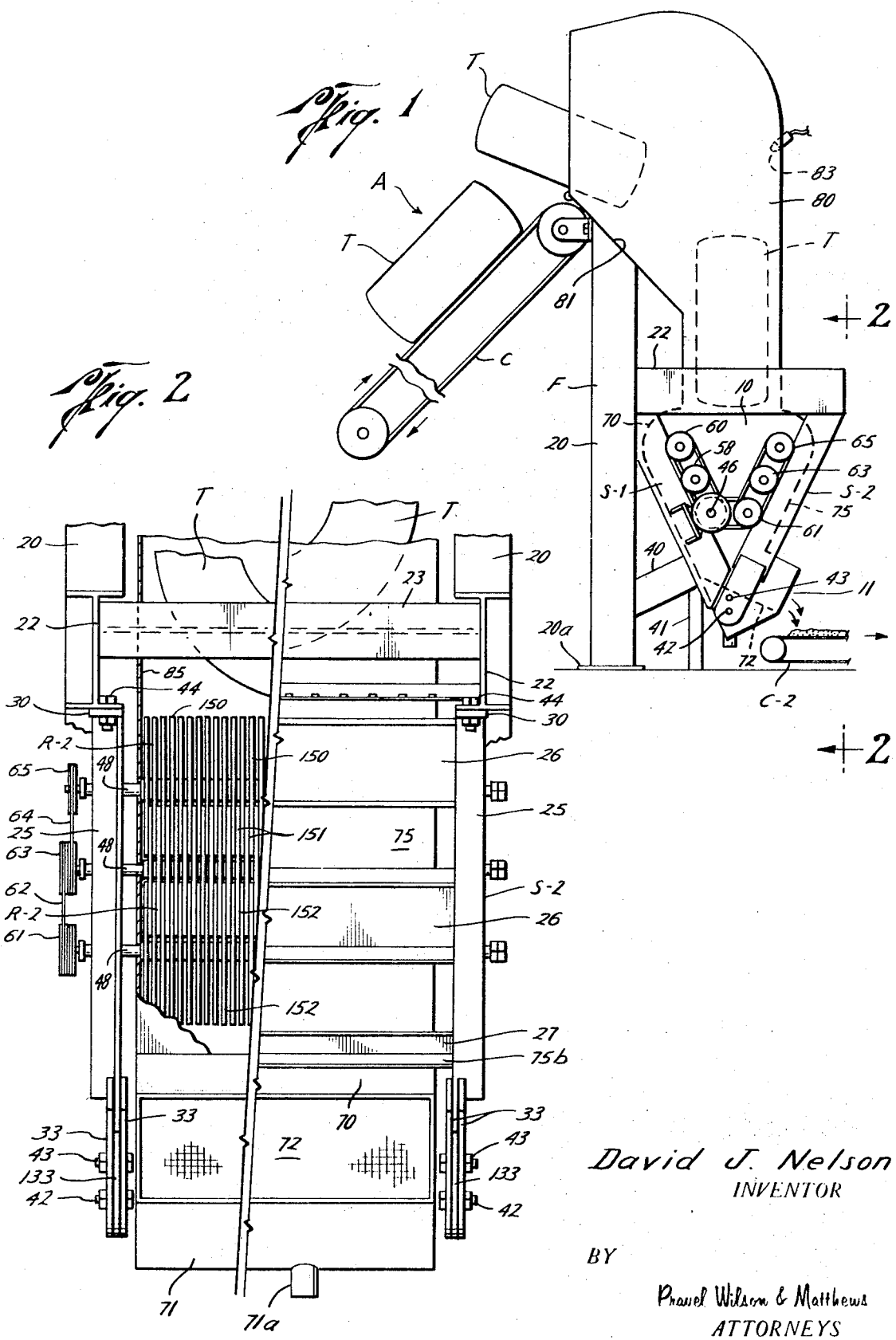

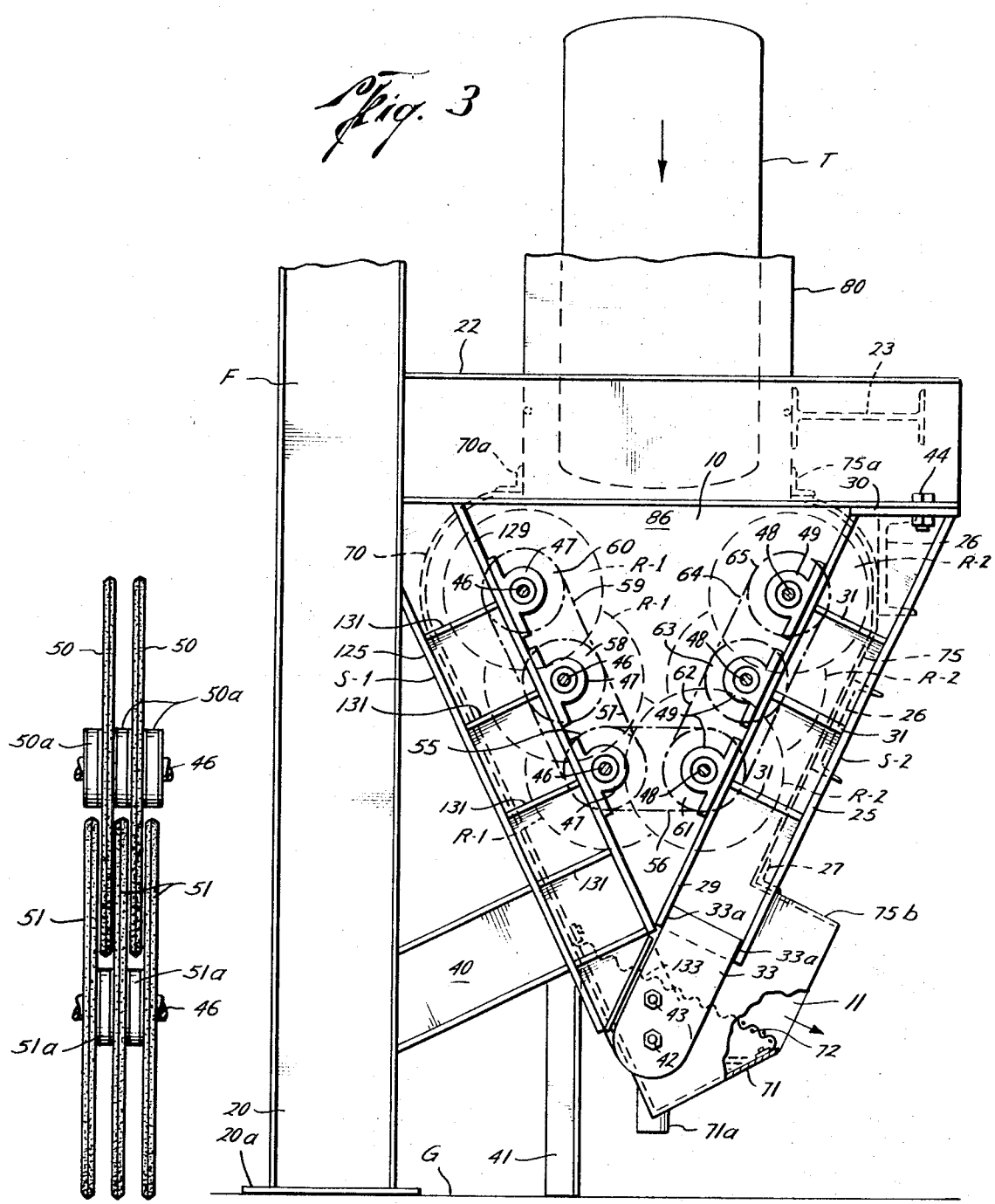

TIRE PULVERIZER

BACKGROUND OF THE INVENTION

The field of this invention is apparatus for pulverizing vehicle tires.

Used vehicle tires have accummulated throughout the United States in alarming quantities, and the rate of increase in recent years has been particularly disturbing. Although practical uses for tire particles have been known for a number of years, such as in oil well lost circulation techniques, and as fillers in asphalt, concrete and other compositions, such uses of vehicle tires has been virtually nil because of the lack of satisfactory apparatus for pulverizing the tires. One of the major problems has been to provide an apparatus which is capable of shredding or cutting both the rubber and reinforcing wires or other reinforcing material of the tire into small enough particles for use.

SUMMARY OF THE INVENTION

The present invention solves the problems of the prior art by providing an apparatus which has a plurality of rows of interfitting abrading rotatable blades which preferably tend to self-feed a tire therethrough and which cut the rubber and the wire or other reinforcement therewith into small particles which may be used without further cutting.

BRIEF DESCRIPTION OF THE DRAWING

FIG. 1 is an elevation of the apparatus of this invention;

FIG. 2 is an enlarged view of a portion of the apparatus of FIG. 1, taken on line 2—2 of FIG. 1;

FIG. 3 is an enlargement of the lower portion of the tire pulverizer illustrated in FIG. 1; and FIG. 4 is an enlarged, detailed view illustrating the interfitting relationship of the blades on adjacent rows in the tire pulverizer illustrated in FIGS. 1—3.

DESCRIPTION OF THE PREFERRED EMBODIMENT

In the drawings, the letter A designates generally the apparatus of this invention which is adapted to pulverize tires T into relatively small particles. Briefly, the apparatus A includes a frame support F which has therewith a first blade support frame S-1, and a second blade support frame S-2. The blade support frame S-1 is disposed at an angle with respect to the blade support frame S-2 so as to provide an inlet mouth 10 therebetween at one end and a discharge outlet 11 at the other end. The frame support S-1 has a plurality of rows or sets of blades R-1 which are arranged so that the blades on each of the rows R-1 interfit with each other (FIG. 4), as will be more fully explained. Similarly, the support frame S-2 has a plurality of rows or sets of blades R-2 which interfit with each other. The rows or sets R-1 and R-2 are disposed at an angle with respect to each other, preferably at substantially the same angle as the support frames S-1 and S-2 so as to form a pocket of substantially V-shape into which each of the tires T is fed, so that the tire cannot pass through the blades on each of the rows R-1 and R-2 without being cut into small particles which are ultimately discharged at the outlet 11.

Considering the invention in more detail, the support frame F preferably includes a pair of vertically disposed structural members 20 which may be conventional steel I-beams each of which has a base 20a resting upon the ground G or other foundation. The structural members 20 are interconnected laterally by any suitable braces (not shown) which are welded thereto or are otherwise affixed. For stability, the structural members 20 may be secured to the ground or other foundation G in any known manner. A substantially horizontal frame member 22 extends outwardly from each of the structural vertical members 20. The horizontal frame members 22 are preferably connected near their outer ends by a channel member 23, or any other suitable structural brace, which is welded or is otherwise affixed to the structural members 22.

The blade support frames S-1 and S-2 are preferably formed in substantially the same manner, although it is preferable to connect the frame member S-1 to the support frame F, while the blade support frame S-2 is pivotally connected to the blade support frame S-1 and is also releasably connected to the structural horizontal frame members 22. For ease in description, reference is made first to the blade support frame S-2 shown in FIGS. 2 and 3, wherein it can be seen that such frame S-2 includes a pair of laterally spaced side frame bars 25, which are preferably conventional angle iron bars. The side bars 25 are interconnected by any suitable braces such as braces 26 which are channel members and brace 27 which is an angle iron. The particular structural configuration of each of such braces 26 and 27 may be varied, as will be well understood by those skilled in the art. Preferably, the braces 26 and 27 are welded or are otherwise secured to both of the side bars 25.

A pair of angle bars 29 which are also laterally spaced and are in alignment with the angle bars 25 (FIG. 3), are connected with the angle bars 25 by a top plate 30 which is welded to each pair of bars 25 and 29. Also, connecting gussets 31 are preferably provided for interconnecting each pair of the bars 25 and 29, and therefore, they are welded or are otherwise suitably connected together. At the lower ends of each pair of the bars 25 and 29, a pivot plate 33 is welded at 33a or at any other suitable point to such bars 25 and 29 so as to form a continuation thereof, for a purpose to be hereinafter more fully explained.

The support frame S-1 includes a pair of outwardly disposed side bars 125 which correspond with the bars 25 of the frame S-2. Similar side bars 129 corresponding to the side bars 29 are also provided in the blade support frame S-1, and such side bars 125 and 129 are welded or are otherwise secured together, preferably using gussets 131. The upper ends of the four side bars 125 and 129 are welded to the frame F as best seen in FIG. 3, with the bars 125 being secured to the vertically extending structural members 20 and with the inwardly disposed bars 129 being welded to the substantially horizontally disposed structural members 22. The lower portion of the frame S-1 is preferably supported by inclined channel members 40 which are welded to the vertically extending structural members 20 and the bars 125. Further support is preferably provided by a plurality of legs 41 which extend downwardly below the frame S-1 and preferably are welded thereto in any suitable location.

For pivotally mounting the frame S-2 on the frame S-1, the frame S-1 has a central hinge plate 133 welded to each side thereof for disposition between a pair of the plates 33 which are welded to each side of the frame S-2 (FIGS. 2 and 3). Suitable openings are provided through the plates 33 and 133 for receiving pivot bolts 42 and locking bolts 43 with the usual nuts therewith. The upper end of the frame S-2 is releasably bolted or is otherwise releasably secured by bolts 44 or other similar means which extend through the top plates 30 and a flange on the structural member 22 (FIG. 3). Thus, when the bolts 43 and 44 are removed, the pivot bolts 42 serve to retain the frame S-2 pivotally connected to the frame S-1 so that the frame S-2 may be pivoted downwardly from the position shown in FIG. 3 to expose the sets of blades R-1 and R-2 for replacement or repair.

Each set or row of blades R-1 is mounted on a rotatable shaft 46, the ends of which are mounted in suitable pillow block bearings 47 which are disposed on the bars 129. Similarly, each of the rows of blades R-2 is mounted on a shaft 48 which is rotatably positioned in a pillow block bearing 49 secured to the bars 29.

The arrangement of the blades in each of the rows R-1 and R-2 is the same, although the blades on alternate rows are laterally offset with respect to each other so that they interfit as seen in the detailed view of a portion of such blades (FIG. 4). Thus, in FIG. 4, a portion of the blades 50 in one of the rows R-1, having shaft 46 therewith is illustrated in interfitting relationship with blades 51 in an adjacent row R-1 on one of the other shafts 46. It is to be noted that the adjacent shafts 46 are spaced a predetermined distance apart which is approximately equal to the radius of the circular blades 50 and 51. Suitable spacer rings 50a are provided on the shaft 46 with the blades 50, and spacer rings 51a are provided on the other shaft 46 with the circular blades 51. The spacers 50a are slightly wider than the thickness of the blades 51, and similarly, the thickness of the spacers 51a are slightly wider than the thickness of the blades 50. The amount of space thus left between the blades 50 and 51 is predetermined so that the size of the particles which may pass therebetween is likewise predetermined.

Each of the blades 50 and 51, as well as the other blades which are utilized in the rows of blades R-1 and R-2, is a circular blade having tungsten carbide surfacing or other similar hard material which is capable of abrading and cutting through rubber as well as metal. The hard surfacing on the blades 50 and 51 is not only along the outer peripheral edge of the blades, but it also is preferably along at least a portion of the sides of the blades near the outer periphery thereof so that a combination cutting and grinding action occurs to accomplish the cutting up of the material of the tires into small particles.

The alternate sets or rows of blades R-1 interfit with each other as illustrated in FIG. 4, and similarly, the alternate sets or rows of blades R-2 interfit in the same manner, such as illustrated by the blades 150, 151 and 152 in FIG. 2. Additionally, the lowermost sets of blades R-1 and R-2 as seen in FIG. 3, interfit with each other in the same manner so that the blades in the sets or rows R-1 and R-2 form a pocket thereabove which is of substantially a V-shape, and with the inlet mouth 10 forming the opening of the pocket. Since the pocket is closed by the blades on the rows or sets of blades R-1 and R-2, the tires T which are fed thereto and into the pocket thus formed, cannot pass beyond such blades until the tires T have been cut into small enough particles to pass through the spaces between the blades.

The sets of blades R-1 and R-2 may be driven by any power means, but as illustrated in the drawings, the lowermost shaft 46 is connected to a motor which drives a pulley or sprocket 55 which has a belt or chain 56 in driving relationship therewith. Also, the sprocket 55, or a companion sprocket therewith (not shown) is connected to a chain or belt 57 which extends to a pulley or sprocket 58 on the next shaft 46, and a similar belt or pulley 59 extends from the sprocket 58 or a companion sprocket therewith (not shown) to another pulley or sprocket 60 on the uppermost shaft 46.

The belt or chain 56 drives a pulley or sprocket 61 on the lowermost shaft 48, which in turn drives a companion sprocket (FIG. 2) connected to a belt or chain 62 and which extends to a pulley or sprocket 63. A belt or chain 64 extends from a companion pulley 63 (FIG. 2) to an uppermost sprocket or pulley 65 so that the single motor driving the sprocket 55 may be utilized for driving all of the shafts 46 and 48. The shafts 46 and 48 are preferably rotated clockwise and the shafts 48 are rotated counter-clockwise. To accomplish this, drive shaft 46 and the lowermost shaft 48 may be connected in driving relationship with gears so that the shafts 48 are rotated in the opposite direction to the shafts 46. If the belt 56 is used, it can be twisted one turn to accomplish the same reversal. This produces a self-feeding effect on the tires T to pull them into the blades to further facilitate the cutting of the tires into the small particles.

A metal chute or housing, preferably formed of sheet metal surrounds the set of blades R-1 and R-2 for confining the tire particles after they have passed through the blades and for directing them towards the outlet 11. Thus, a chute 70 is mounted outwardly of the sets or rows of blades R-1 and is suitably secured at the upper end to an angle iron support member 70a. The lower end of the chute 70 is formed with a bottom section 71 which forms a receptacle or tank for receiving water or other fluid which is utilized in connection with the apparatus, as will be more fully explained. A discharge or outlet pipe 71a is connected to the bottom of the chute 70 for the discharge of the water or other liquid from the reservoir formed at the bottom of the chute 70 with the plate 71. A screen 72 is utilized above the reservoir and it is inclined so that tire particles may freely move across the screen 72 for discharge at the outlet 11, while permitting water with the particles to pass through the screen 72 into the reservoir and then out of the discharge pipe 71a.

A similar chute 75 is mounted with the frame S-2 and is preferably welded or otherwise secured to the braces 26 and 27. Also, the upper end of the chute 75 is connected to a support member 75a. The lower end of the support member 75 extends at an angle as indicated at 75b so as to provide the opening 11.

The sets or rows of blades R-1 and R-2 are preferably completely surrounded by a cover or housing which includes the chutes 70 and 75, as well as side housing plates 85 (FIG. 2) and 86 (FIG. 3), which are only partially visible, but which extend to the side chutes 70 and 75 in the preferred form of the invention.

Although the tires T could be fed into the apparatus A in any desired manner, it is more efficient to feed them in a substantially upright or vertical position (FIG. 3) into the mouth 10 of the pocket formed by the sets or rows of blades S-1 and S-2. Since the tires T are often large and difficult to handle, a moving conveyor C (FIG. 1) of any conventional construction is employed to feed the tires T upwardly into a housing 80 which has an inclined inner plate 81 therewith for tipping the tires T and sliding them down to the vertical portion of the housing 80 where the tires T assume the upright or substantially vertical position. Water or other liquid is preferably introduced through a spray nozzle 83 extending into the housing 80 to facilitate the cutting of the tires T into small particles with the abrading blades on the rows or sets R-1 and R-2. With the tire in the position illustrated in FIG. 3, and at the lowermost point in FIG. 1, the external circumference of the tire is lying in a plane that substantially bisects the space between the rows of blades R-1 and R-2.

In the operation or use of the tire pulverizer A of this invention, the tires T which are to be cut into small particles with the apparatus A are preferably fed thereto in sequence on the conveyor (FIG. 1), which discharges them into the housing 80 where they are tipped as they slide down the inclined plate 81 so that each tire is upright at the lower portion of the housing 80 when each tire enters the mouth 10 of the sets or rows of blades R-1 and R-2. Preferably, only one tire enters the mouth 10 at a time to prevent jamming, but smaller tires may be fed in groups (two are shown in FIG. 2) so long as jamming is avoided. Water or other fluid is introduced at the spray 83 to facilitate the cutting action by the sets of blades R-1 and R-2. Each tire T is completely pulverized as it passes through the blades, with the particles thus formed being fed down the chutes 70 and 75 to the screen 72 so that the water or other liquid therewith may pass through the screen 72 and out through the discharge pipe 71a. The pulverized tire particles may be collected at the outlet 11 on a conveyor C-2 (FIG. 1) or by a truck or any other transportation equipment.

With the apparatus of this invention, standard automobile tires can be pulverized at the rate of two tires per minute, which means that approximately 1,000 tires can be pulverized in an 8 hour day, thereby indicating the commercial value of this invention. The pulverized particles may be used in various processes, some of which are already known, so that used tires which have heretofore been a waste problem now may be a valuable material or component for many industrial applications.

The foregoing disclosure and description of the invention are illustrative and explanatory thereof, and various changes in the size, shape, and materials as well as in the details of the illustrated construction may be made without departing from the spirit of the invention.

I claim:

1. A tire pulverizer for cutting vehicle tires into small particles, comprising:

a support frame adapted to be disposed on the ground or other base;

said support frame having a first blade support frame and a second blade support frame;

said first and second support frames being mounted generally vertically at an acute angle with respect to each other and a vertical axis therebetween and being spaced apart a greater distance and the upper ends thereof than at the lower ends thereof to form an inlet mouth at said upper ends and an outlet discharge at said lower ends;

a plurality of rows of adjacent tire cutting and abrading blades mounted on each of said support frames and disposed one above the other at substantially the same generally vertical inclination of each of said first and second support frames;

each of said blades having a generally circular periphery and disposed on its shaft for rotation therewith in a generally vertical plane;

each of said blades having a cutting edge at its periphery with tungsten carbide or the like hard surfacing material thereon at said periphery for abrading and cutting vehicle tires into small pieces as they fall downwardly between the rows of said blades on said support frames from the uppermost rows through the lowermost rows;

means for mounting the blades on the adjacent rows of said blades on said first blade support means so that they interfit with each other;

means for mounting the blades on the lowermost row of blades on said first blade support means and the blades on the lowermost row of blades on said second blade support means so that they interfit with each other so as to form a cutting barrier through which the tires must pass to be discharged at the lower ends of said support frames to thereby effect a pulverizing of the tire into very small particles.

2. The structure set forth in claim 1, wherein:

said mounting means includes a rotatable shaft for each row of said blades;

said shaft for each row of said blades on each of said blade support frames being mounted a predetermined distance from each other;

the radial dimension of each blade being approximately the same as said predetermined distance;

means for holding the blades on adjacent shafts offset with respect to each other for thereby interfitting the blades on the adjacent shafts with each other; and tungsten carbide or the like hard surfacing material on the sides of each of said blades near the periphery thereof for abrading the vehicle tires.

3. The structure set forth in claim 2 wherein said means for holding said blades offset, comprises:

spacers on each shaft and disposed on each side of each blade; and each of said spacers having a thickness approximately equal to but slightly greater than the thickness of each blade to thereby dispose the sides of the interfitting alternate rows of blades in close proximity to each other to control the size of tire particles cut thereby and which may pass therebetween.

4. The structure set forth in claim 1, including:

side housing plates extending substantially vertically on each side of said support frames and in close proximity to the end blade for each row of blades; and said blades on each of said rows extending for substantially the full width between said side housing plates for confining the tires passing between said rows of blades for pulverizing said tires.

5. The structure set forth in claim 1, including:

means for guiding a tire substantially vertically into said inlet mouth between said rows of blades at said mouth, with the external circumference of the tire lying in a plane that substantially bisects the space between said rows of blades on said first and second blade support frames.

6. The structure set forth in claim 1, including:

a discharge chute formed externally of said first and second blade support frames for receiving and discharging the tire particles formed by the tires passing through said blades.

7. The structure set forth in claim 1, including:

means for feeding tires in sequence between said rows of blades at said inlet mouth.

8. The structure set forth in claim 7, including:

means for shifting each tire to an upright substantially vertical position as it is fed to said inlet mouth.

9. The structure set forth in claim 1, including:

means for spraying water or the like onto each tire so as to wet same for facilitating the pulverizing of the tire by said blades.

* * * * *